United States Statutory Invention Registration [19]

[11] Reg. Number: H484

Holliday

[43] Published: Jun. 7, 1988

[54] POLARIZATION ISOLATION AND ZERO TIME-SIDELOBE PULSE COMPRESSION THROUGH GROUP-COMPLEMENTARY CODING

[75] Inventor: Edward M. Holliday, Huntsville, Ala.

[73] Assignee: The United States of America as represented by the Secretary of the Army, Washington, D.C.

[21] Appl. No.: 87,859

[22] Filed: Aug. 20, 1987

[51] Int. Cl.[4] ..... G01S 7/28

[52] U.S. Cl. ..... 342/201; 332/23 R

[58] Field of Search ..... 333/104, 128, 164; 332/23, 29

[56] References Cited

U.S. PATENT DOCUMENTS

| | | | |
|---|---|---|---|
| 2,551,348 | 5/1951 | Sunstein | 332/23 |
| 3,517,338 | 6/1970 | Herman et al. | 332/23 |
| 3,686,588 | 8/1972 | Jackson et al. | 332/29 |
| 4,276,521 | 6/1981 | Davidheiser | 332/23 |
| 4,329,687 | 5/1982 | Kloevekorn | 342/136 |
| 4,353,067 | 10/1982 | Mims | 342/201 |
| 4,472,717 | 9/1984 | Eaves et al. | 342/159 |
| 4,513,288 | 4/1985 | Weathers et al. | 342/201 |
| 4,580,139 | 4/1986 | Weathers et al. | 342/189 |

*Primary Examiner*—Stephen C. Buczinski
*Assistant Examiner*—Linda J. Wallace
*Attorney, Agent, or Firm*—John C. Garvin, Jr.; Freddie M. Bush; Robert C. Sims

[57] ABSTRACT

This concept makes use of the orthogonal nature of Group-Complementary Codes to achieve improved polarization isolation between the vertical and horizontal radiation in a circularly polarized or dual linearly polarized antenna system while achieving zero time-sidelobe responses in pulse compression. Two channels of a radar system are established with each being encoded using an orthogonal Group-Complementary Code. One channel is associated with the vertical polarization of radiation while the second is devoted to the horizontal polarization. With a leading or lagging 90 degree phase relationship between the two channels, right hand or left hand circular polarization can be established according to the code of each channel which controls the relative phase. Such a technique of pulse compression and group complementary coding offers improved polarization isolation between channels while achieving zero-time sidelobes in pulse compression. The same isolation would be realized for a two channel system radiating simultaneous linear but orthogonal polarization.

5 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

POLARIZATION ISOLATION AND ZERO TIME-SIDELOBE PULSE COMPRESSION THROUGH GROUP-COMPLEMENTARY CODING

DEDICATORY CLAUSE

The invention described herein may be manufactured, used, and licensed by or for the Government for governmental purposes without the payment to us of any royalties thereon.

BACKGROUND OF THE INVENTION

Pulse compression involves the rearrangement of the temporal distribution of energy in a Radio Frequency (RF) pulse in such a way that a long transmitted pulse with a given energy is transformed to a shorter received pulse with the same energy. Since the total energy is the same for both, the instantaneous power during the shortened pulse is therefore greater than the instantaneous power during the long pulse. Pulse compression is useful in radar systems for improving range resolution and discrimination of unwanted signals such as radar clutter and multiple targets. In active sensors pulse compression allows long-pulse, limited peak power systems to achieve performance equivalent to a shorter-pulse higher-peak power system. Ideally, pulse compression is implemented with matched filters where the processing device is a network with impulse response matched to the time reverse of the long-pulse waveform. This matched-filter operation results in maximizing the signal-to-noise ratio and in optimum detection of the target.

Many waveforms have been used for pulse compression, including coding of the phase of a carrier signal. Bi-phase modulation using binary codes is one common approach with Barker Codes being popular. Other binary waveforms that have been used for pulse compression include pseudo-random codes and random binary codes. Nonbinary waveforms that have been use for pulse compression include FM modulation signals and polyphase codes.

A problem that has limited the utility of pulse compression and correlation receivers in radar system has been the existence of temporal/range sidelobes in the correlation function of the radar waveform. These sidelobes allow out-of-range-gate returns, such as clutter, to compete with a target in a particular range gate of interest. A number of research efforts have addressed this problem in the past, and several waveform designs have resulted in the potential reduction or elimination of the range sidelobe problem. For example, Barker codes are known for lengths only up to $N=13$, and they do not match the desired "perfect" range correlation property.

Application of Golay code pairs (also known as complementary sequences) involves processing two coded pulses at a time in a radar processor to eliminate the range sidelobes. These codes have the property that when their individual range sidelobes are combined (algebraic addition), the composite sidelobes completely cancel, yielding the desired perfect correlation property.

Pulse compression, through a new technique, has been revealed (U.S. Pat. No. 4,472,717) which utilizes the polarization of the expanded and radiated signal as the vehicle of coding to achieve compression of the received pulse. This is a unique approach which offers a doppler insensitive waveform, avoiding the mismatch losses suffered in typical pulse compression methods.

mismatch losses suffered in typical pulse compression methods.

Most pulse expansion/compression techinques result with undesirable time-sidelobe responses which require amplitude weighting (windowing) to achieve acceptable sidelobes. A pulse encoding and processing technique has been developed (U.S. Pat. No. 4,513,288) to achieve zero time sidelobes, this approach being called Group Complemetary Coding. The combination of Group Complementary Coding and polarization pulse compression is expected to offer enhanced exploitation of target and clutter polarization characteristics for discrimination between the two.

This disclosure presents definition of the two techniques and addresses combining the two for the benefit of achieving pulse compression with zero time sidelobe responses and improving polarization isolation between orthogonally polarized channels.

SUMMARY OF THE INVENTION

This concept makes use of the orthogonal nature of Group-Complementary Codes to achieve improved polarization isolation between the vertical and horizontal radiation in a circularly polarized or dual linearly polarized antenna system while achieving zero time-sidelobe responses in pulse compression. Two channels of a radar system are established with each being encoded using an orthogonal Group-Complementary Code. One channel is associated with the vertical polarization of radiation while the second is devoted to the horizontal polarization. With a leading or lagging 90 degree phase relationship between the two channels, right hand or left hand circular polariztion can be established according to the code of each channel which controls the relative phase. Such a technique of pulse compression and group complementary coding offers improved polarization isolation between channels while achieving zero-time sidelobes in pulse compression. The same isolation would be realized for a two channel system radiating simultaneous linear but orthogonal polarization.

DETAILED DESCRIPTION OF THE PREFERRED EMBODIMENT

Figure 1:
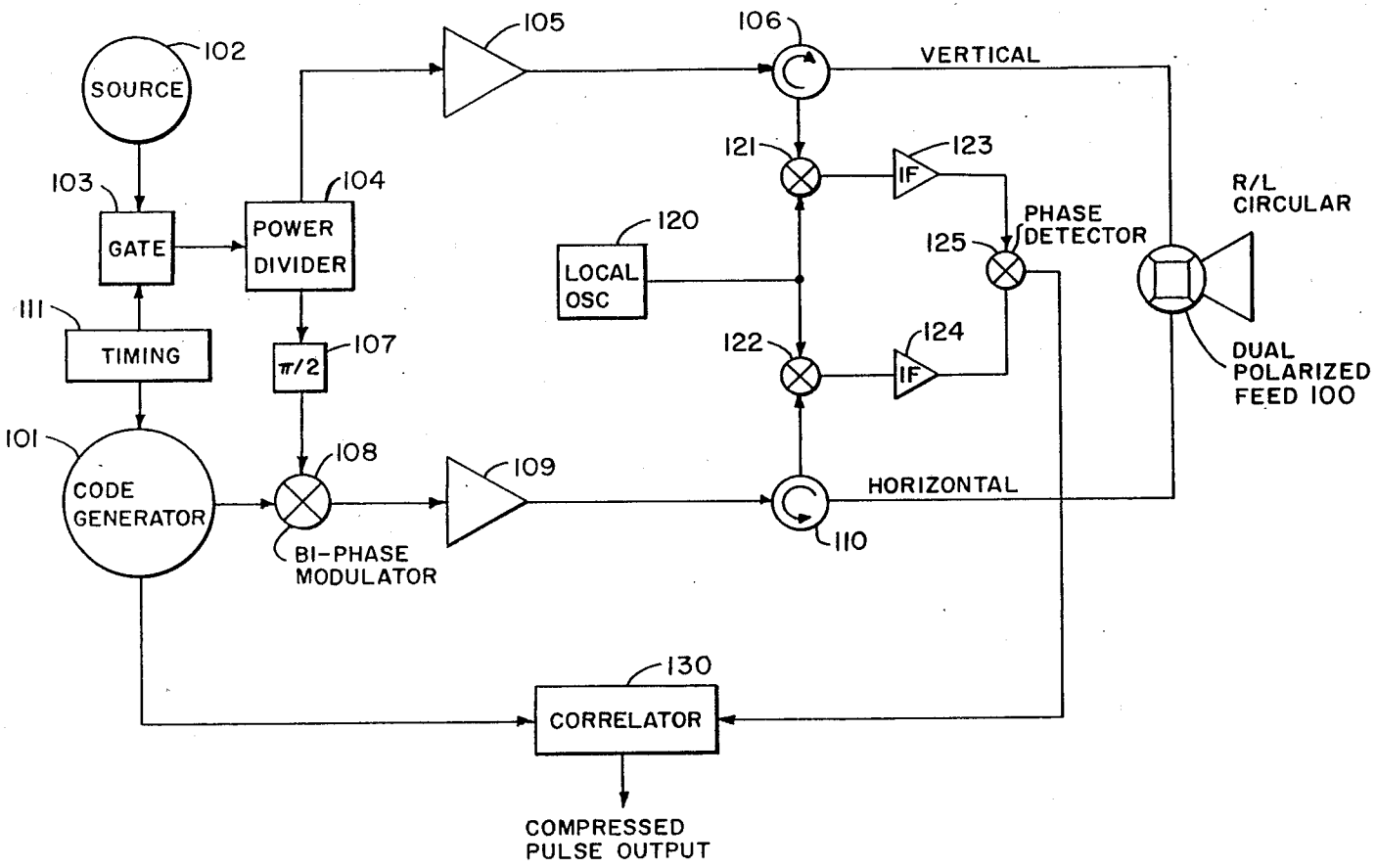
FIG. 1 is a block diagram illustrating polarization pulse compression.

Under research a new pulse compression scheme surfaced, this being the process of achieving pulse compression while operating upon the polarization of the radiated transmission. FIG. 1 presents the basic approach which uses the transmitted and received polarization as the information carrier to achieve pulse compression. By establishing two channels and controlling the relative phase between the two transmitting channels, a circularly polarized wave of either right hand or left hand sense can be generated within the time frame of the pulse. Thus, with a sequence of polarization switching occurring within the transmitted pulse, an even reflector will return the same sequence. An odd reflector, however, will return a pulse with the polarization sense of each subpulse element being complemented, resulting in a complemented sequence being received versus that transmitted.

Since the polarization sense takes on two states, right or left, a binary sequence may be used to encode the transmitted pulse. Upon reception, the encoded sequence can be recovered as the polarization sense changes within the pulse. The received and detected sequence can then be cross-correlated with the sequence used at transmission encoding. For even reflection returns, a positive correlation will result while for odd reflection returns a negative correlation will be achieved. For systems exploiting polarization characteristics of desired and undesired signals in such reflections it is necessary that the two channels not interact and have polarization isolation. Also, out-of-range responses, in the form of time sidelobes, are always of concern in pulse compression systems. Typically, these are suppressed through amplitude weighting (not shown) of the received signal, at the expense of decrease range resolution. With only two states of polarization being radiated within the transmitted pulse, it is convenient to apply binary coding form code generator 101. Optimum binary codes such as Barker and maximal-length are appliable to this pulse compression scheme. Such codes offer reduced time sidelobes while a new category called "Group Complementary Codes" offers zero time sidelobes, and if orthogonal codes are applied to each channel, isolation will be improved.

FIG. 1 shows a power source 102 connected through a gate 103 to a power divider 104. The vertical channel goes through amplifier 105 through a TR circulator 106 to feed 100. The horizontal channel goes through a 90° phase shifter 107. It is bi-phase modulated by the output of code generator 101 in the bi-phase modulator 108 amplified by amplifier 109 and is sent through TR circulator 110 feeding 100. Timing unit 111 controls the outputing of gate 103 and code generator 101. Therefore, FIG. 1 depicts a simple implementation in a noncoherent transceiver where only one channel (horizontal) is encoded to establish a positive or negative 90 degree bias phase relationship with respect to the vertical channel. With one channel applied to the vertical port of a dual polarized antenna feed 100 and the other applied to the horizontal port, right or left hand sense circular polarization is radiated in accordance with the bi-phase modulation imposed by the code generator on one channel. Since the modulation is either 0 or 180, the 90 difference in the phases of the two channels is maintained. Other configurations are realizable, including coherence with the source. One such configuration would apply orthogonal codes to each channel while maintaining the plus or minus 90 degree phase relationship between the two channels. With the codes to each channel being orthogonal, cross-talk between the channels is eliminated and improved polarization isolation results.

The two channels are applied to a dual polarized feed antenna such that a circularly polarized wave of right-/left hand sense (within the pulse envelope) is radiated. A received pulse of right hand/left hand sense will result in the outputs of the two receiver ports. These outputs are mixed with the local oscillator 120 in mixers 121 and 122 so to become IF signals which are amplified by amplifiers 123 and 124 and sent to phase detector 125. Ideally, these two signals will be related by plus or minus 90 degrees in phase. Performing a phase detection between the two signals will result in a binary output according to the plus/minus 90 degree relative phase. For an even bounce reflector, the same right/left hand sense subpulse pattern will be received and the original binary code will be recovered at the phase detector. For an odd bounce reflector the opposite sense polarization pattern will be received, and a complement of the original code will be recovered.

The recovered code can be correlated with the original code in correlator 130 to achieve the effective pulse compression. Since the recovered code may be the original code or its complement, depending upon the energy reflector, a positive or negative correlation will result as the compressed pulse output. As with any pulse compression scheme, time sidelobes arise because of the redistribution of energy under the ambiguity function. As polarization is use to carry the modulation and information for pulse compression, time sidelobes likewise arise. Such undesirable responses permit out-of-range target energy to be ambiguous with the desired in-range target response. These undesired responses may be eliminated with the application of binary coding called "Group-Complementary Codes". Such codes have the unique property of zero-time-sidelobes. In addition, they can be applied in such a way as to improve the polarization isolation of a polarmetric signal processing sensor.

Figure 2:
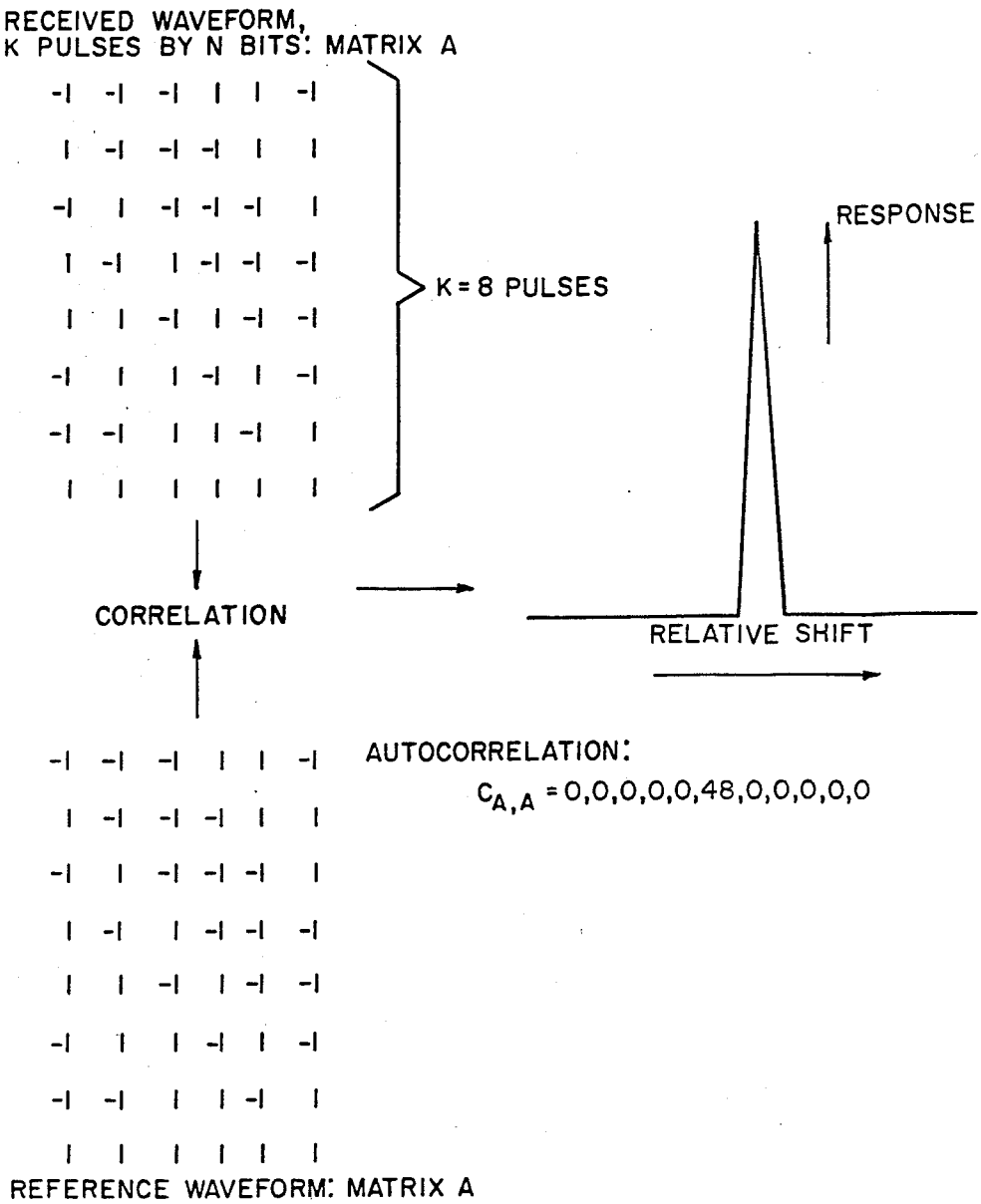
FIG. 2 is a block diagram showing a generic system for polarization pulse compression with orthogonal codes.

Group Complementary codes are extensions of the complementary code concept introduced by Golay. The codes discussed here and shown in FIG. 2 are matrices of K by N binary elements, and the pulse-compression processing involves transforming K long pulses, each coded with one of the K rows of N-bit binary words, into one single short pulse. Therefore, the pulse compression is a composite operation over a number of pulses rather than on a single pulse. For a more detailed description see U.S. Pat. Nos. 4,513,288 Apr. 23, 1985) and 4,472,717 (Sept. 18, 1984).

A binary group-complementary matrix is composed of K rows and N columns with each element being a plus or minus "1". Each row is a code word used to encode each of K radio-frequency pulses using bi-phase modulation. The first $K-1$ rows are shifted versions of the same maximal-length code word but with an extra bit of value "1" added at the end. The last row of the matrix is composed of all "1"s. Since a new matrix may be established for each unique maximal-length word, M unique matrices exist for M unique code words. A very large set of group-complementary matrices may be generated from this configuration. An initial unique, but square, matrix may be operated upon in four different ways, in combination or separately, to generate new group-complementary code matrices while maintaining the desired and beneficial properties: (1) one or more columns may be truncated, (2) columns or rows may be interchanged, (3) one or more rows may be complemented, and (4) one or more columns may be complemented.

Group-complementary codes have another beneficial property which can be exploited in sensor design and development. This feature involves mutual orthogonality of code matrixes. The group-complementary code matrix, A, FIG. 2, may be operated upon to create new matrices while maintaining the autocorrelation properties of the original matrix. A special case is when N is even and N/2 columns of the original matrix are inverted to form a second matrix. For this case, the cross-correlation between the two matrices is identically zero. This is an ideal property for two closely deployed sensors, whose transmissions can be synchronized, each using one of the code matrices for pulse compression. This provides mutually noninterfering operation over the unambiguous interval. Likewise if each channel of a polarmetric radar is encoded with orthorgonal codes, improved polarization isolation, over that inherent in the antenna system, would be achieved.

The basic approach of encoding one channel with a biphase code such that a plus/minus 90 degree phase relation exist between the channels for each subpulse element can benefit in time sidelobe performance through the use of Group-Complementary Codes. Any out-of-range responses will be excluded from in-range responses because of the zero-time-sidelobe nature of these codes. Consequently, the detection of polarmetric properties of reflectors, targets, clutter, etc., will be enhanced by this additional discrimination.

Some target or reflector configurations can be envisioned wherein the approach of encoding only one channel of the transmission may result in out-of-range reflector contributions to in-range reflector responses or result in no response to a reflector. Two cases independent of the code used, will be illustrated: (1) If the reflector depolarizes the return such that either the horizontal or vertical component is absent in the received signal, the phase detection process will not recover a received code; (2) If two reflectors are separated in range (one returning opposite sense circular polarization and the other only linear polarization) a situation can be generated where the linear reflector will look like a sidelobe of the circular reflector. Neither of these cases would result if each channel of the transceiver is encoded separately. Likewise doppler insensitivity would not be achieved. With each channel encoded separately pulse compression would be achieved on each channel with or without time sidelobes, depending upon the codes used.

Figure 3:
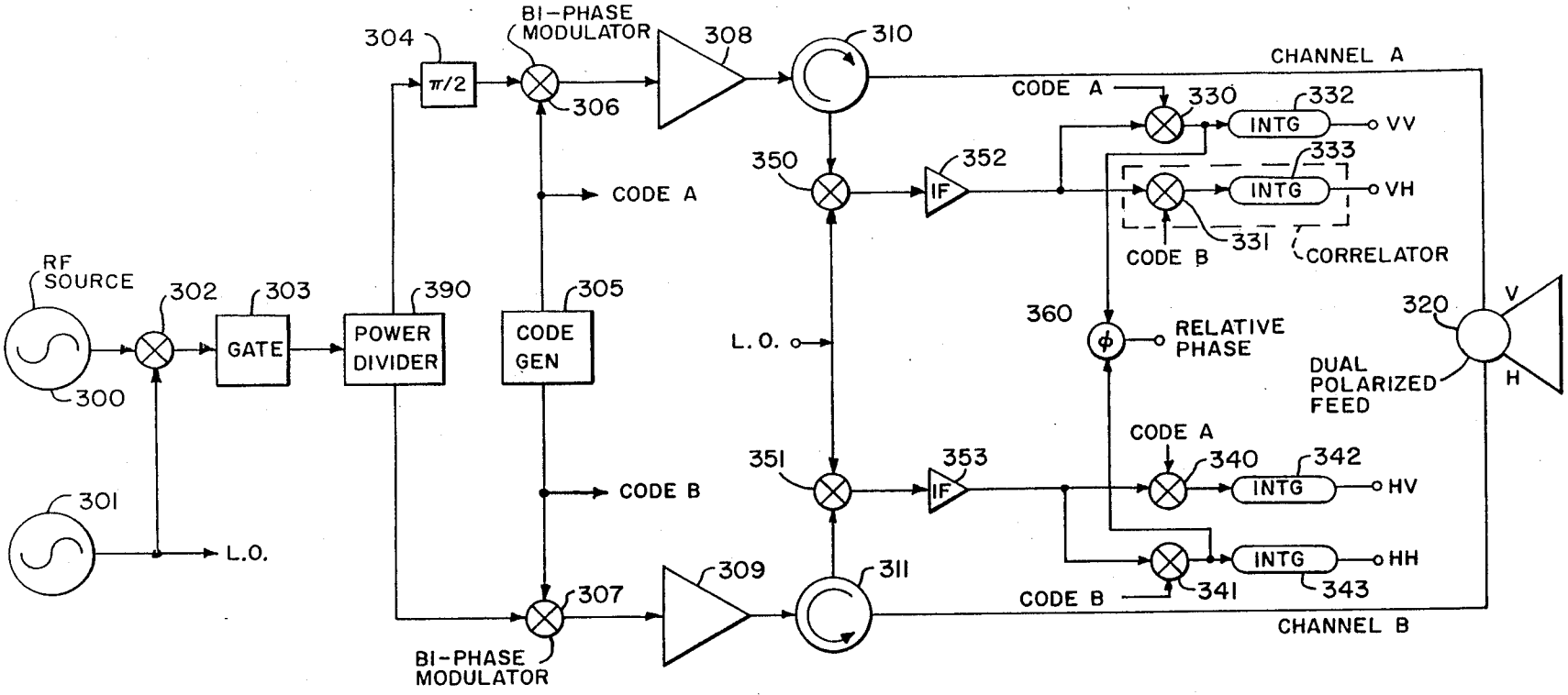
FIG. 3 illustrates a group complementary matrix structure.

Group-Complementary Codes can be generated which are orthogonal. With use of such codes, one on each channel, cross-talk between channels would not occur and polarization isolation would be improved over that realized with a given antenna system. Such an implementation is shown in FIG. 3.

The objective is to establish two RF channels which have a phase relationship of 90 degrees, one leading or lagging the other. The RF source 300 is mixed with LO source 301 by mixer 302 and gated by gate 303 to power divider 340. The 90° phase shifter 304, provides the desired phase relationship. One channel, A, is associated with vertical polarization and the other, B, is associated with horizontal polarization. The two codes A and B are generated by code generator 305 and individually modulate the channels by way of bi-phase modulators 306 and 307. The signals are then amplified by power amplifiers 308 and 309 and sent to the dual polarized feed antenna 320 by way of circulators 310 and 311. The modulators have a main input terminal, an output terminal and a controlled input terminal. The output of each channel may be combined in a polarization transducer such that circular polarization is radiated with a right hand or left hand sense in accordance with the 90 degree difference in phase relationship between the channels. This relationship is maintained regardless of the modulation, as there is either a 0 or 180 degree phase shift. Alternatively, the output of each channel may feed its corresponding linear radiator to achieve simulataneous radiation of horizontal and vertical polarization; one from channel A and the other from channel B.

The received RF reflections are processed in two channels, one for vertical polarization and the other for horizontal polarization. Mixers 350 and 351 and IF amplifiers 352 and 353 convert the return signals to IF. The vertical channel output is correlated with code A. The correlators are made up of mixers 330 and 331 and integrators 332 and 333. The horizontal channel output is correlated with code B. The correlator combination consists of mixers 340 and 341 and integrators 342 and 343. With use of Group Complementary Codes, a compressed pulse would be achieved as output of each correlator with the inherent zero time sidelobe characteristic. In addition, no horizontal component received in the vertical channel or vertical component received in the horizontal channel (cross components) would appear in the respective outputs since the codes can be selected to be orthogonal. Thus no cross-talk occurs between channels, and polarization isolation is realized. Likewise using reference code B to correlate channel A's output would cause a response in channel A because of any horizontal component depolarized by the reflector and received in channel A. A similiar situation is true for obtaining any vertical component introduced in channel B. Therefore, polarization scattering matrix elements may be obtained with the addition of the two extra correlators and a phase detector 360 shown in FIG. 3. The top and bottom correlators shown provide the HH and VH elements of the matrix while the remaining elements HV and VV may be obtained with the two additional correlators. The received signal of channel A could be correlated with the code of channel B to yield the VH element and the output of channel B could be correlated with the code of channel A to yield the HV element. The addition of phase detector 360 with inputs from channel A and channel B after code removal will yield the relative phase between the two channels to complete the measurement of elements of a relative scattering matrix.

A different approach to pulse compression has been presented. The phase of two carriers are operated upon such that each carries codes which are independent and orthogonal. This results in pulse compression on each channel with zero time-sidelobes and polarization isolation between channels.

Application of Group-Complementary Coding to the pulse compression approach using circular polarization as the information carrier offers improved performance through properties of zero time-sidelobes and orthogonality. Polarization characteristics of targets and clutter can be enhanced through the use of Group Complementary Coding because of their features.

I claim:

1. A system for identifying target signatures comprising a source of radio frequency (RF) signals; divider means connected to said signals so as to divide the signals into first and second paths; first and second controllable bi-phase shifting means having first and second controlled input terminals; first and second main input terminals and first and second output terminals; said main input terminals being connected to the divider means such that the first and second paths flow respectable through said main input terminal and said output terminal of the first and second phase shift means; a code generator means connected to the controlled input terminals of the controllable phase shift means so as to cause a phase shift of the radio frequency signals in said paths at selected times in accordance to the code generated by the code generator; a 90 degree phase shifter connected between said divider means and the main input terminal of said first biphase shifting means; a dual polarized feed antenna having horizontal and vertical feeds connected to said first and second paths respectively; a phased detector having first and second inputs and an output; said dual polarized feed antenna transmitting radar signals in accordance to the phase shifted RF signals and detecting vertically and horizontal components of the signals reflected by targets and clutter; and first connection means connecting the vertical component to the first input of the phased detector and the horizontal component to the second input of the phased detector, whereby the output of the phased detector will be a signal which is an indicator of the target signature that reflected the RF signals and have a relative phase which is indentical to that transmitted.

2. A system as set forth in claim 1 wherein said biphase shifting means shifts the phase by 180 degrees upon command from its controlled input terminal so as to provide either right circular polarized or left circular polarized radar signals of the antenna in accordance to the code on the code generator.

3. A system as set forth in claim 2 wherein the code generated by the code generator means is a group complementary code.

4. A system as set forth in claim 3 wherein said code generator means generates first and second codes which are orthogonal group complementary codes; and said first and second codes are fed respectively to said first and second controlled input terminals.

5. A system as set forth in claim 4 further comprising correlator means connected to the vertical component and horizontal component of the reflected radar signals and to said code generator means for correlating the reflected signals to the codes generated.

* * * * *